United States Patent
Fraden (10) Patent No.: US 7,785,266 B2
(45) Date of Patent: Aug. 31, 2010

(54) MEDICAL THERMOMETER FOR DETERMINING BODY CORE TEMPERATURE

(75) Inventor: Jacob Fraden, San Diego, CA (US)

(73) Assignee: Advanced Monitors Corporation, San Diego, CA (US)

(*) Notice: Subject to any disclaimer, the term of this patent is extended or adjusted under 35 U.S.C. 154(b) by 750 days.

(21) Appl. No.: 11/297,094

(22) Filed: Dec. 8, 2005

(65) Prior Publication Data

US 2007/0055171 A1    Mar. 8, 2007

Related U.S. Application Data

(63) Continuation-in-part of application No. 10/870,654, filed on Jun. 18, 2004, and a continuation-in-part of application No. PCT/US2005/004884, filed on Feb. 11, 2005, which is a continuation-in-part of application No. 10/870,654, filed on Jun. 18, 2004.

(60) Provisional application No. 60/495,952, filed on Aug. 19, 2003.

(51) Int. Cl.
*A61B 5/00* (2006.01)
(52) U.S. Cl. ................................. 600/549
(58) Field of Classification Search .............. 600/484, 600/549, 559, 584, 583; 606/182
See application file for complete search history.

(56) References Cited

U.S. PATENT DOCUMENTS

| | | | |
|---|---|---|---|
| 3,156,117 A | 11/1964 | Benzinger | |
| 3,531,992 A | 10/1970 | Moore | |
| 3,570,312 A | 3/1971 | Kreith | |
| 3,681,991 A | 8/1972 | Eberly, Jr. | 73/362 |
| 3,832,902 A | 9/1974 | Usami et al. | |
| 3,872,726 A | 3/1975 | Kauffield | 73/362 |
| 3,893,058 A | 7/1975 | Keith | 338/28 |
| 3,903,744 A | 9/1975 | Cone | 73/362 |
| 3,933,045 A | 1/1976 | Fox et al. | 73/359 |
| 3,935,744 A | 2/1976 | Beckman | 73/361 |
| 3,942,123 A | 3/1976 | Georgi | 328/1 |
| 3,946,613 A | 3/1976 | Silver | 73/362 |
| 3,949,609 A | 4/1976 | Hammerslag | 73/362 |
| 3,978,325 A | 8/1976 | Goldstein et al. | 235/151.3 |
| 4,009,615 A | 3/1977 | Ruhl | 73/362 |

(Continued)

FOREIGN PATENT DOCUMENTS

| | | |
|---|---|---|
| CH | 514834 C2 | 4/2001 |
| DE | 2913048 A1 | 10/1980 |
| EP | 0747682 A1 | 12/1996 |
| WO | 96/19938 A1 | 7/1996 |
| WO | 2006009585 A1 | 1/2006 |

OTHER PUBLICATIONS

U.S. Patent and Trademark Office, Office Action in U.S. Appl. No. 10/870,654, Mar. 27, 2007.

(Continued)

*Primary Examiner*—Max Hindenburg
*Assistant Examiner*—Fangemonique Smith
(74) *Attorney, Agent, or Firm*—Wood, Herron & Evans, LLP (57) ABSTRACT

A temperature sensing device including at least a first contact type temperature sensing element determines body core temperature of a warm blooded animal or human based on an estimated skin temperature of the patient which is computed based on temperature measurements obtained by the first sensing element.

14 Claims, 4 Drawing Sheets

U.S. PATENT DOCUMENTS

| | | | |
|---|---|---|---|
| 4,022,063 A | 5/1977 | West et al. | 73/362 |
| 4,068,526 A | 1/1978 | Goldstein | 73/362 |
| 4,158,965 A | 6/1979 | Prosky | 73/362 |
| 4,161,880 A | 7/1979 | Prosky | 73/342 |
| 4,166,389 A | 9/1979 | Montren | 73/343 |
| 4,183,248 A | 1/1980 | West | |
| 4,204,429 A | 5/1980 | Shimazaki et al. | 73/362 |
| 4,411,535 A | 10/1983 | Schwarzschild | 374/165 |
| 4,439,290 A | 3/1984 | Marfurt et al. | 204/149 |
| 4,444,517 A | 4/1984 | Murase | 374/188 |
| 4,454,370 A | 6/1984 | Voznick | 136/221 |
| 4,457,633 A | 7/1984 | Andrews | 374/209 |
| 4,461,584 A | 7/1984 | Murase | 374/188 |
| 4,464,067 A | 8/1984 | Hanaoka | 374/170 |
| 4,487,208 A | 12/1984 | Kamens | 128/736 |
| 4,503,862 A | 3/1985 | Baessler | 128/736 |
| 4,536,851 A | 8/1985 | Germanton et al. | 364/557 |
| 4,537,518 A | 8/1985 | Murase | 374/188 |
| 4,539,994 A | 9/1985 | Baumbach et al. | 128/635 |
| 4,541,734 A | 9/1985 | Ishizaka | 374/169 |
| 4,549,819 A | 10/1985 | Muramoto et al. | 374/178 |
| 4,572,365 A | 2/1986 | Bruno et al. | 206/306 |
| 4,588,306 A | 5/1986 | Burger et al. | 374/158 |
| 4,602,871 A | 7/1986 | Hanaoka | 374/102 |
| 4,619,271 A | 10/1986 | Burger et al. | 128/736 |
| 4,629,336 A | 12/1986 | Ishizaka | 374/169 |
| 4,636,091 A | 1/1987 | Pompei et al. | 374/124 |
| 4,648,055 A | 3/1987 | Ishizaka et al. | 364/557 |
| 4,651,750 A | 3/1987 | Northeved | |
| 4,691,713 A | 9/1987 | Suzuki | 128/736 |
| 4,729,672 A | 3/1988 | Takagi | 374/208 |
| 4,763,522 A | 8/1988 | Pompei | 73/338 |
| 4,843,577 A | 6/1989 | Muramoto | 364/557 |
| 4,846,583 A | 7/1989 | Yamamoto | 374/163 |
| 4,863,279 A | 9/1989 | Markel et al. | 374/109 |
| 4,866,621 A | 9/1989 | Ono | 364/413.03 |
| 4,874,253 A | 10/1989 | Pompei et al. | 374/121 |
| 4,877,333 A | 10/1989 | Ota et al. | 374/169 |
| 4,880,076 A | 11/1989 | Ahlberg et al. | |
| 4,930,222 A | 6/1990 | Nakanishi et al. | 374/170 |
| 4,987,579 A | 1/1991 | Yoshinaka et al. | 377/25 |
| 4,993,419 A | 2/1991 | Pompei et al. | 128/664 |
| 5,011,294 A | 4/1991 | Yamaguchi | 374/107 |
| 5,012,813 A | 5/1991 | Pompei et al. | 128/664 |
| 5,017,019 A | 5/1991 | Pompei | 374/133 |
| 5,050,612 A | 9/1991 | Matsumura | 128/670 |
| 5,056,048 A | 10/1991 | Seperant | 364/557 |
| 5,062,432 A | 11/1991 | James et al. | |
| 5,088,836 A | 2/1992 | Yamada et al. | 374/183 |
| 5,088,837 A | 2/1992 | Shiokawa et al. | 374/185 |
| 5,116,136 A | 5/1992 | Newman et al. | 374/102 |
| 5,126,937 A | 6/1992 | Yamaguchi et al. | 364/413.11 |
| 5,149,200 A | 9/1992 | Shiokawa et al. | 374/185 |
| 5,150,969 A | 9/1992 | Goldberg et al. | 374/128 |
| 5,178,468 A | 1/1993 | Shiokawa et al. | 374/185 |
| 5,183,337 A | 2/1993 | Pompei | 374/2 |
| 5,199,436 A | 4/1993 | Pompei et al. | 128/664 |
| 5,259,389 A | 11/1993 | Muramoto et al. | 128/736 |
| 5,271,407 A | 12/1993 | Pompei et al. | 128/664 |
| 5,295,746 A | 3/1994 | Friauf et al. | 374/170 |
| 5,325,863 A | 7/1994 | Pompei | 128/736 |
| 5,333,622 A | 8/1994 | Casali et al. | |
| 5,333,784 A | 8/1994 | Pompei | 236/91 C |
| 5,381,796 A | 1/1995 | Pompei | 128/664 |
| 5,445,158 A | 8/1995 | Pompei | 128/664 |
| 5,469,855 A | 11/1995 | Pompei et al. | 128/664 |
| D370,860 S | 6/1996 | Pompei et al. | D10/57 |
| 5,628,323 A | 5/1997 | Pompei | 128/664 |
| 5,632,555 A | 5/1997 | Gregory et al. | 374/102 |
| RE35,554 E | 7/1997 | Pompei et al. | 374/121 |
| 5,642,735 A | 7/1997 | Kolbly | 128/736 |
| 5,653,238 A | 8/1997 | Pompei | 128/664 |
| 5,653,239 A | 8/1997 | Pompei et al. | 128/664 |
| 5,655,305 A | 8/1997 | Fletcher | 374/170 |
| 5,673,692 A | 10/1997 | Schulze et al. | |
| 5,688,266 A | 11/1997 | Edwards et al. | 606/31 |
| 5,725,308 A | 3/1998 | Smith et al. | 374/169 |
| 5,732,711 A | 3/1998 | Fitzpatrick et al. | 128/736 |
| 5,743,648 A | 4/1998 | Zeindler | 374/151 |
| 5,836,692 A | 11/1998 | Pompei | 374/121 |
| 5,873,833 A | 2/1999 | Pompei | 600/474 |
| 5,874,736 A | 2/1999 | Pompei | 250/338.1 |
| 5,893,833 A | 4/1999 | Pompei et al. | 600/549 |
| 5,894,126 A | 4/1999 | Pompei et al. | 250/338.1 |
| 5,897,552 A | 4/1999 | Edwards et al. | 606/31 |
| 6,000,846 A | 12/1999 | Gregory et al. | 374/164 |
| 6,036,361 A | 3/2000 | Gregory et al. | 374/185 |
| 6,045,257 A | 4/2000 | Pompei et al. | 374/132 |
| 6,047,205 A | 4/2000 | Pompei | 600/474 |
| 6,048,902 A | 4/2000 | Lebwohl et al. | 514/725 |
| 6,056,435 A | 5/2000 | Pompei | 374/133 |
| 6,059,452 A * | 5/2000 | Smith et al. | 374/169 |
| 6,068,399 A | 5/2000 | Tseng | 374/163 |
| 6,074,090 A | 6/2000 | Chen | 374/183 |
| 6,146,015 A | 11/2000 | Weiss | 374/164 |
| 6,179,785 B1 | 1/2001 | Martinosky et al. | |
| 6,219,573 B1 | 4/2001 | Pompei | 600/474 |
| 6,220,750 B1 | 4/2001 | Palti | 374/164 |
| 6,241,384 B1 | 6/2001 | Pompei et al. | 374/126 |
| 6,250,802 B1 | 6/2001 | Doton | 374/164 |
| 6,257,758 B1 | 7/2001 | Culbertson | 374/120 |
| 6,280,397 B1 | 8/2001 | Yarden et al. | 600/549 |
| 6,283,915 B1 | 9/2001 | Aceti et al. | |
| 6,292,685 B1 | 9/2001 | Pompei | 600/474 |
| 6,299,347 B1 | 10/2001 | Pompei | 374/133 |
| 6,319,206 B1 | 11/2001 | Pompei et al. | 600/549 |
| 6,402,371 B2 | 6/2002 | Pompei et al. | 374/128 |
| 6,419,388 B2 | 7/2002 | Lee | 374/208 |
| 6,450,970 B1 | 9/2002 | Mahler et al. | 600/549 |
| 6,499,877 B2 | 12/2002 | Pompei | 374/133 |
| 6,522,912 B1 | 2/2003 | Nakatani et al. | 600/474 |
| 6,547,744 B1 | 4/2003 | Pompei et al. | 600/549 |
| 6,556,852 B1 | 4/2003 | Schulze et al. | |
| 6,629,776 B2 | 10/2003 | Bell et al. | 374/170 |
| 6,641,301 B2 | 11/2003 | Pompei | 374/125 |
| 6,794,990 B2 | 9/2004 | Tseng | 340/584 |
| 6,827,487 B2 | 12/2004 | Baumbach | |
| 6,830,549 B2 | 12/2004 | Bui et al. | 600/549 |
| 6,839,651 B2 | 1/2005 | Lantz et al. | 702/130 |
| 6,854,882 B2 | 2/2005 | Chen | 374/208 |
| 6,957,911 B2 * | 10/2005 | Wong et al. | 374/208 |
| 2001/0025151 A1 | 9/2001 | Kimball et al. | |
| 2002/0010390 A1 | 1/2002 | Guice et al. | |
| 2002/0114375 A1 | 8/2002 | Pompei | |
| 2002/0138017 A1 | 9/2002 | Bui et al. | |
| 2002/0150143 A1 * | 10/2002 | Tokita et al. | 374/163 |
| 2003/0139686 A1 | 7/2003 | Rubinstein | |
| 2004/0025871 A1 * | 2/2004 | Davies | 128/203.12 |
| 2004/0076215 A1 | 4/2004 | Baumbach | |
| 2004/0243021 A1 * | 12/2004 | Murphy et al. | 600/549 |
| 2005/0043631 A1 | 2/2005 | Fraden | |
| 2005/0211436 A1 | 9/2005 | Fripp et al. | |

OTHER PUBLICATIONS

U.S. Patent and Trademark Office, International Search Report and Written Opinion in PCT Application Serial No. PCT/US2005/004884, Oct. 14, 2005.

European Patent Office, Supplementary European Search Report in EP Application No. EP05713646, May 28, 2009.

* cited by examiner

*Fig.10* ns reading of IR
MEDICAL THERMOMETER FOR DETERMINING BODY CORE TEMPERATURE

CROSS REFERENCE TO RELATED APPLICATIONS

This application is a continuation-in-part of U.S. application Ser. No. 10/870,654, filed on Jun. 18, 2004, now pending, and is a continuation-in-part of International application Ser. No. PCT/US2005/004884 filed Feb. 11, 2005, now expired, which is a continuation-in-part of U.S. application Ser. No. 10/870,654 (now pending) which claims the priority of U.S. application Ser. No. 60/495,952 filed Aug. 19, 2003 (now abandoned). Each of International Application No. PCT/US2005/004884, U.S. application Ser. No. 10/870,654 and U.S. application Ser. No. 60/495,952 has been assigned to the assignee of this application and is incorporated by reference herein.

FIELD OF THE INVENTION

The present invention relates generally to medical thermometers and, more particularly, to medical thermometers that determine body core temperature.

BACKGROUND OF THE INVENTION

Body core temperature is universally accepted as an important indicator of the physical condition of humans and other warm blooded animals.

For many years, the most common and traditional method of determining body core temperature was to insert a traditional contact-type thermometer, such as a mercury-in-glass thermometer or an electronic pencil thermometer, into a body orifice of a patient, such as into the mouth or rectum of a patient. As known in the art, a traditional contact-type thermometer includes a probe with a thermal temperature sensor that responds to the temperature of an object, i.e., the surface of a body orifice, with which the sensor is placed in contact. The rate of response of the sensor depends on the degree of thermal coupling between the sensor and the surface, the physical characteristics of the surface, the isolation of the sensor from other components in the thermometer and the thermal capacity of the sensor.

Traditional contact-type thermometers typically determine body core temperature in accordance with either the equilibrium technique or the predictive technique. In the equilibrium technique, the sensor of the thermometer needs to remain inserted, and typically be maintained in contact with a surface, in the mouth, rectum or other body orifice of a patient for a relatively long time. A long contact interval is required because the contact-type thermometer relies upon the conduction of heat to the sensor to determine body core temperature. The sensor remains in contact with the surface until the sensor stabilizes its response, such that the respective temperatures of the sensor and the surface become nearly equal. Although a contact-type thermometer operating in accordance with the equilibrium technique will provide an accurate indication of body core temperature, the temperature measurement process is slow and also uncomfortable for a patient.

In a traditional contact-type thermometer that determines body core temperature in accordance with the predictive technique, the sensor of the thermometer is inserted into the body for a short period of time which is not long enough for the respective temperatures of the sensor and contact surface to become nearly equal. During the time that the sensor is inserted into the body orifice, the rate of response of the sensor is measured. The measured rate of response is then used to mathematically estimate the temperature at which the sensor and surface would have become equal had the sensor and the surface been maintained in contact with each other for a sufficiently long time. Accordingly, the predictive technique determines body core temperature of a patient without requiring that the sensor be maintained in contact with the patient until the sensor achieves an equilibrium temperature. As known in the art, some contact-type thermometers rely on software data processing, while others rely on a hardware design to determine body core temperature in accordance with the predictive technique. For example, in one prior art traditional contact-type thermometer a hardware integrator is used to estimate the equilibrium temperature of a slow responding thermistor of the thermometer. Although the predictive technique provides for a much quicker determination of body core temperature than the equilibrium technique, the equilibrium technique provides for greater accuracy in the determination of body core temperature than the predictive technique.

The prior art also includes thermometer apparatuses that determine body core temperature based on the detection of infrared ("IR") energy signal emissions from the tympanic membrane or ear canal of a patient. In operation of a typical IR thermometer, an IR sensor that takes a reading of IR energy, and any associated sensing elements in the IR thermometer, are not required to be inserted into, or placed in contact with a surface of, a body orifice of a patient. The determination of body core temperature based on an IR energy reading, thus, avoids the need to insert a probe into a body orifice of a patient. In addition, IR thermometers can determine body core temperature within a few seconds. Further, some IR thermometers determine body core temperature based on measurements of skin temperature obtained from detection of IR energy emission and ambient temperature.

IR thermometers, however, have several drawbacks. The accuracy and operability of an IR thermometer depend on the operator's technique in positioning the thermometer to detect an IR energy signal. Also, ambient temperature, and the cleanliness of an IR lens within the IR thermometer, can affect the accuracy and operability of an IR thermometer. Further, the components included in a typical IR thermometer are relatively expensive, such that an IR thermometer constitutes a relatively costly device.

Therefore, a need exists for a thermometer apparatus for determining body core temperature which is easy and relatively inexpensive to manufacture, provides for a relatively quick determination of body core temperature, has an accuracy and operability that does not depend an operator technique, requires only minimal contact with the patient and does not require insertion of a portion of the apparatus into a body orifice of a patient.

SUMMARY OF THE INVENTION

In accordance with the present invention, a temperature sensing device for determining body core temperature of a patient, such as a warm blooded animal or human, includes a housing coupled to a first contact-type temperature sensing element containing a first temperature sensor. The first sensing element generates at least a first temperature data signal representative of a temperature measurement made at the first sensor while the sensor is in thermal contact with the skin of the patient. The device computes the skin temperature of the patient from the temperature data signal, and then computes the body core temperature of the patient from the computed skin temperature. The device further includes an indication means, such as an audio or visual display, for communicating the computed body core temperature to the operator.

In one embodiment, the first sensor generates a plurality of temperature data signals representative of temperature measurements made at the first sensor while, and optionally before, the first sensor is placed in thermal contact with the skin of the patient. The device uses the temperature data signals to compute a rate of heat flow at the first sensor when the first sensor is in thermal contact with the patient's skin, and then computes the skin temperature based on the computed heat flow rate.

In a further embodiment, the device includes a second temperature sensor coupled to the housing, and a thermal insulator positioned between the first and second temperature sensors for thermally decoupling the first and second temperature sensors from each other. The second temperature sensor is positioned within the housing so that it is thermally decoupled from the skin of a patient when the first temperature sensor makes thermal measurements of the skin. The second temperature sensor generates second temperature data signals representative of the temperature within the housing, and the device computes a reference temperature for the housing based on the second temperature data signals. The device determines body core body temperature of the patient based on the skin temperature, which is computed from temperature measurements made by the first sensing element, and the computed reference temperature.

In another aspect of the present invention, the device includes a moveable element that carries the first sensing element. The movable element is movable into at least a first position, in which the first sensing element is not adapted for contact with the skin of the patient, and a second position, in which the first sensing element is adapted for contact with the skin of the patient. In a further embodiment, the moveable element includes a shaft formed from a thermally insulating material, and further including or coupled to a resilient element. The resilient element, which can be a mechanical element such as spring or a conventional chemical or polymeric composition having resilient characteristics, normally biases the first sensing element toward the first position, and is compressed when the first sensing element is in the second position.

In a further embodiment, the device includes a guard coupled to the housing and configured to surround and protect the first sensing element. The guard is moveable relative to the first sensing element to provide that the first sensing element contacts the skin of the patient when the first sensor of the device is operated to measure the temperature of the patient's skin.

In a still a further embodiment, the device includes a handling detector coupled to the sensor(s) of the device and which detects handling of the device by a user. The handling detector includes or is coupled to an activation means. When the handling detector detects handling of the device by the user, the activation means causes the sensor(s) and other electronic components in the device to be energized.

In another embodiment, the handling detector includes a switch mechanically coupled to and for detecting movement of the first sensing element. The switch is coupled to the activation means. When the switch detects movement of the first sensing element, the activation means causes the sensor(s) and other electronic components in the device to be energized.

BRIEF DESCRIPTION OF THE DRAWINGS

Other objects and advantages of the present invention will be apparent from the following detailed description of illustrative embodiments, which description should be considered in conjunction with the accompanying drawings in which like references indicate similar elements and in which.

DETAILED DESCRIPTION OF THE INVENTION

Figure 1:
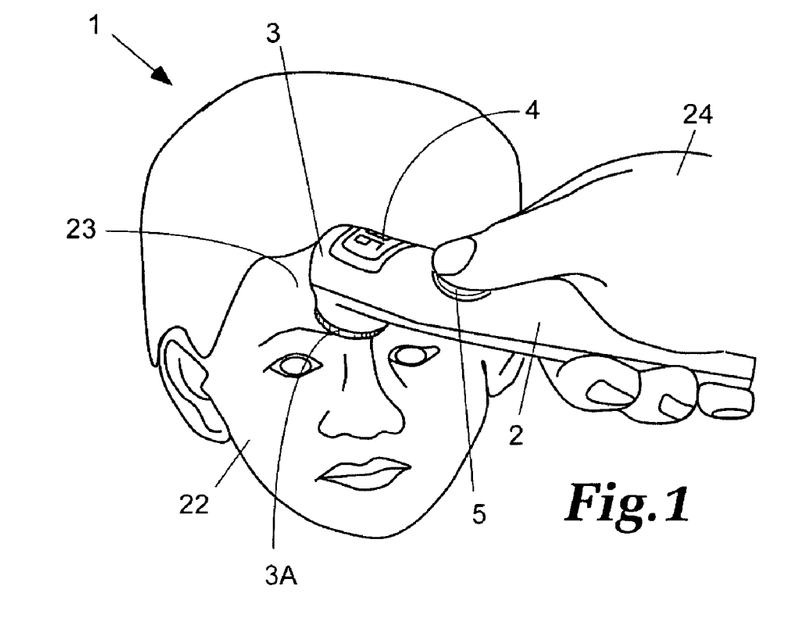
FIG. 1 is a perspective view of an exemplary embodiment of a thermometer, in accordance with the invention, shown with a probe touching the skin of a patient's forehead.

FIG. 1 illustrates one embodiment of a thermometer 1 for determining body core temperature of a patient in accordance with the present invention. Referring to FIG. 1 and to FIG. 7, which shows interconnections among components contained within the thermometer 1, the thermometer 1 includes a housing 2 coupled to a probe 3. The exterior surface of the housing 2 is configured so that a user's hand 24 can grip the housing 2 and cause a contact end 3A of the probe 3 to contact (touch) the skin of a patient 22, such as the patient's forehead 23.

The outer surface of the housing 2 includes a display 4 coupled to a microcontroller 34 for visually indicating the body core temperature of the patient determined by the thermometer 1. It is to be understood that the thermometer 1 can also or alternatively include an audio means, such as a speaker, for indicating the body core temperature determined by the thermometer 1. The inventive technique of determining body core temperature of the patient with the thermometer 1, in accordance with the present invention, is discussed in detail below.

Figure 2:
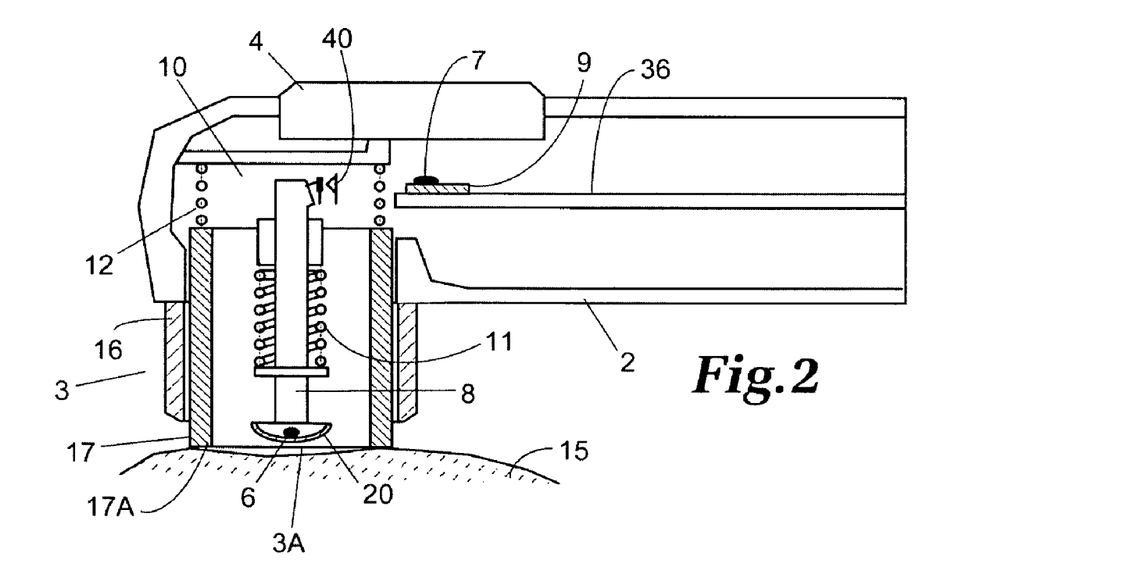
FIG. 2 is a cross-sectional view of the thermometer of FIG. 1 including two absolute temperature sensors and a biased contact plate coupled to a first of the sensors.

FIG. 2 is a cross-sectional view of the housing 2 and the probe 3 portions of the thermometer 1 showing one configuration of components within the thermometer 1 that provides for operation in accordance with the present invention. Referring to FIG. 2, the housing 1 includes a first contact-type temperature sensing element containing a first contact-type thermal sensor 6 mounted on a thermally conductive contact plate 20, a second thermal temperature sensor 7 and a thermal insulator 10 positioned between the two sensors 6 and 7. The insulator 10 functions to thermally decouple the sensors 6 and 7 from each other, and can be a void or air space between the two sensors 6 and 7 or, alternatively, any conventional thermal insulating material.

The plate 20 has a thermal conductivity on the order of about 1 W/° C. and is mounted to the sensor 6 to achieve a high level of thermal coupling therebetween. The plate 20 may be fabricated from a metal having a thermal conductivity between about 50 and 500 W/m° C., such as copper, and have a thickness on the order of about 0.010 inches. The plate 20 may be gold plated on the surface that will contact a patient's skin to prevent oxidization that may result from repeated touching of a patient's skin. In one embodiment, the plate 20 has a convex shape that enhances thermal coupling of the plate 20 with the skin of a patient.

The sensors 6, 7 may be absolute temperature sensors, such as negative temperature coefficient of resistance ("NTC") thermistors, semiconductors or resistance temperature detectors ("RTDs"), that measure temperature with reference to an absolute temperature scale. In an alternative embodiment, one of the sensors 6 or 7 is a relative sensor, such as a thermocouple, and the other of the two sensors is an absolute reference sensor. For purposes of illustrating the present invention, the sensors 6 and 7 of the thermometer 1 constitute thermistors.

Figure 7:
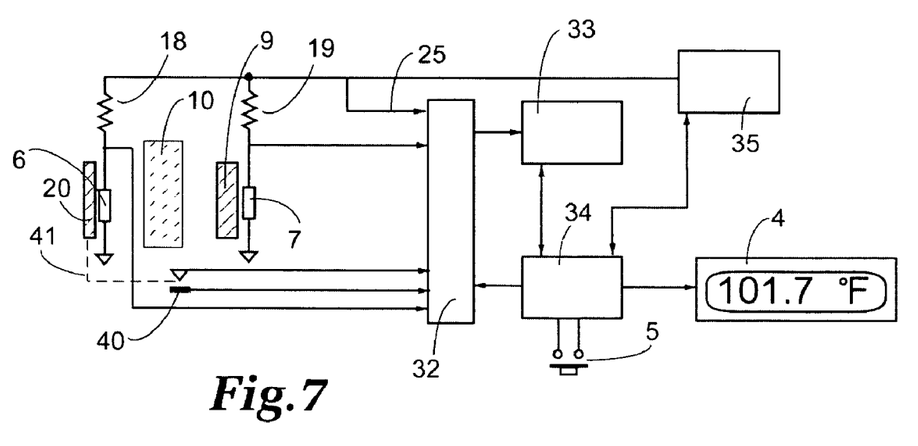
FIG. 7 is a block diagram of one embodiment of the thermometer of FIG. 1.

Referring to FIG. 7, the sensors 6 and 7 are coupled to pull-up resistors 18 and 19, respectively. A power supply circuit 35 is connected to, and generates a constant reference voltage 25 at, the resistors 18, 19. The sensors 6, 7 are coupled, and generate temperature data signals that are transmitted, to a multiplexer 32. The multiplexer 32 acts as a gate that allows data signals from only one of the sensors to pass to an output at a time. The multiplexer 32 includes an output coupled to an analog-to-digital (A/D) converter 33. The microcontroller 34 is coupled to, and suitably can control operations at, each of the elements 32, 33, 4 and 35.

A power switch 5 is disposed on the exterior of the housing 2 and coupled to the microcontroller 34, as shown in FIGS. 1 and 7, respectively. The position of the switch 5 controls supply of electric power to the microcontroller 34 and other electronic components within the thermometer 1. When the switch 5 is depressed, the microcontroller 34 provides that electrical components within the thermometer 1 are energized by electrical power from the power supply circuit 35, so that temperature measurements can be performed on a patient and the body core temperature can be determined as described below in accordance with the present invention The microcontroller 34 is a conventional hardware in combination with software apparatus which can be programmed to perform data processing operations for determining body core temperature in accordance with one embodiment of the present invention. The microcontroller 34 also causes the computed body core temperature to be displayed on the display 4. It is to be understood that a thermometer in accordance with the present invention can include different, conventionally known electronic circuits and components, and different types of sensors, that can be operated to determine body core temperature in accordance with the present invention.

Figure 3:
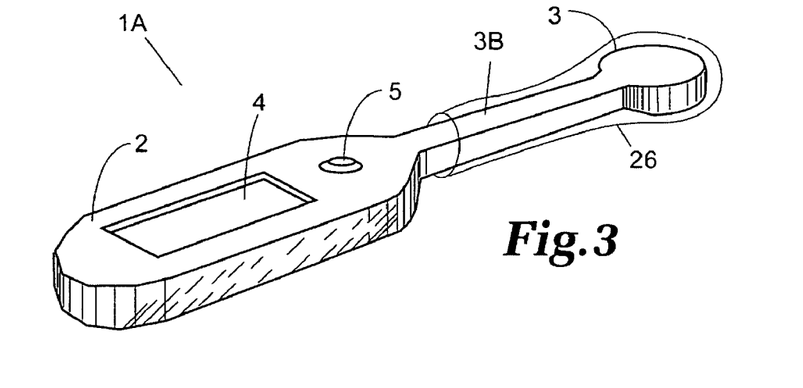
FIG. 3 is a perspective view of another exemplary embodiment of a thermometer in accordance with the present invention.

In another embodiment, a thermometer 1A in accordance with the present invention, as shown in FIG. 3, includes an elongated neck 3B that couples the probe 3 to the housing 2 and a sanitary probe cover 26, which is of a conventional design, for enveloping the probe 3 when the thermometer 1A is not in use. For example, the probe cover 26 is a narrow, elongated bag fabricated of thin polymer film having a thickness on the order of 0.001 inches.

In accordance with the present invention, the inventive thermometer measures temperature at the skin surface of a patient at such body sites as a carotid artery region behind the ear lobe, the tragus area (near the ear), the armpit, the chest, the abdomen, the groin and the forehead. It is to be understood that operation of an inventive thermometer including the forehead probe 3, such as the thermometer 1 shown in FIG. 1, to determine body core temperature is similarly applicable to a thermometer having a probe design that facilitates temperature measurement at other body sites, such as the thermometer 1A shown in FIG. 3.

In operation of the thermometer 1, the first sensor 6 is intended to be placed in thermal contact with the skin of a patient, such as by thermal coupling of the sensor 6 to the skin via the plate 20, while the second sensor 7 is thermally insulated from the patient and the sensor 6 at all times. As explained in detail below, the thermometer 1 does not need to include the sensor 7 in order to determine body core temperature in accordance with the invention. In one embodiment, an inventive thermometer includes a second sensor, which will not be placed in thermal contact with skin of a patient, to enhance accuracy of the body core temperature determination. The second sensor is disposed within the housing of the thermometer so that it is thermally isolated from the sensor that will be placed in thermal contact with skin.

Referring to FIG. 2, the sensor 7 is attached to a mass 9 that does not readily change temperature and has a thermal capacity of at least about 0.1 J/° C., such as a metal plate, and operates to stabilize the thermal response of the sensor 7. The mass 9 is supported on a circuit board 36. The circuit board 36 also includes the microcontroller 34 and the multiplexer 32, and other hardware and/or software components that can perform data processing operations in accordance with the present invention, as described in detail below. The sensors 6 and 7 are connected to components on the circuit board 36 via conductors (not shown).

Referring to FIGS. 1 and 2, the plate 20 is coupled to and supported by a shaft 8. The shaft 8 is normally biased toward the end 3A of the probe 3. The shaft 8 is coupled to or includes a conventional resilient element 11, such as, for example, a chemical or polymeric composition having resilient characteristics or a mechanical device having resilient characteristics. In the exemplary embodiment of the thermometer 1 shown in FIG. 2, the resilient element 11 is a spring. The shaft 8 is mounted or coupled to an interior surface within the housing 2 that is opposite the end 3A of the probe 3. Referring to FIG. 2, the resilient element 11 provides that the plate 20 and the sensor 6 can move in and out of the probe 3 at the end 3A, and normally biases the shaft 8 toward the end 3A. The biasing of the shaft 8 by the resilient element 11 provides that, when the thermometer 1 is used, the plate 20 applies a steady, constant, reliable and sufficient pressure to the skin 15 to maintain consistent thermal contact between the sensor 6 and the patient's skin 15.

Figure 5:
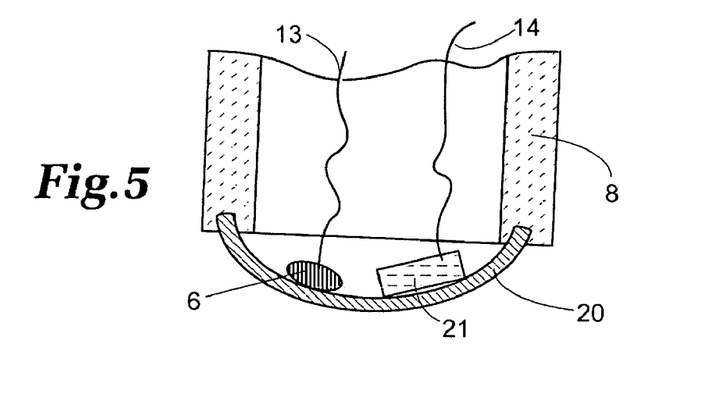
FIG. 5 is a partial cross-sectional view of a portion of a probe of a thermometer in accordance with one embodiment of the present invention.

In one embodiment, the shaft 8 is fabricated of a material with low thermal conductivity and is hollow, as shown in FIG. 5. In addition, the shaft 8 can constitute a part of a thermal insulator 10 in the thermometer 1, as shown in FIG. 2.

Referring again to FIG. 2, the housing 1 further includes a movable component or guard 17 coupled by a conventional resilient element 12 to an interior portion of the housing 2 which is opposite the end 3A of the probe 3. The resilient element 12, similar to the resilient element 11, is a chemical composition having resilient characteristics or a mechanical element, such as a spring. The guard 17 is received in, and movable into and out of, a sleeve 16. The guard 17 and the sleeve 16 are spaced from and encircle the shaft 8 and the plate 20. The resilient element 12 normally biases the guard 17 away from the interior portion of the housing 2 and into a position such that edge 17A of the guard 17, which comes into contact with a patient's skin, extends further away from the interior housing than the plate 20. When the thermometer 1 is not being operated such that the plate 20 is not touching the skin 15 of a patient, the guard 17 protrudes from the sleeve 16 further than the plate 20, thereby shielding and protecting the plate 20 and the sensor 6. Also, while the thermometer 1 is in use, the guard 17 protects components within the probe tip, namely, the plate 20, the sensor 6 and the shaft 8, each of which usually is a fragile component, from possible mechanical damage. The guard 17 and the sleeve 16 may be fabricated of plastic. In one embodiment, the edge 17A of the guard 17 is rubberized to minimize slippage while in use.

In operation of the thermometer 1 to obtain a temperature measurement with the sensor 6, when the edge 17A of the guard 17 comes in contact with the skin 15 and a sufficient pressure is applied so that the guard 17 begins to compress the resilient element 12 and slides inside the sleeve 16, the plate 20 is exposed and comes in contact with the skin 15. Further pressure on the probe 3 compresses both of the resilient elements 11 and 12 until the guard 17 reaches the limit of its movement within the interior of the housing 1. At the limit, the resilient element 11 has a predetermined degree of compression which is sufficient to provide consistent thermal contact between the sensor 6 and the skin 15.

Figure 4:
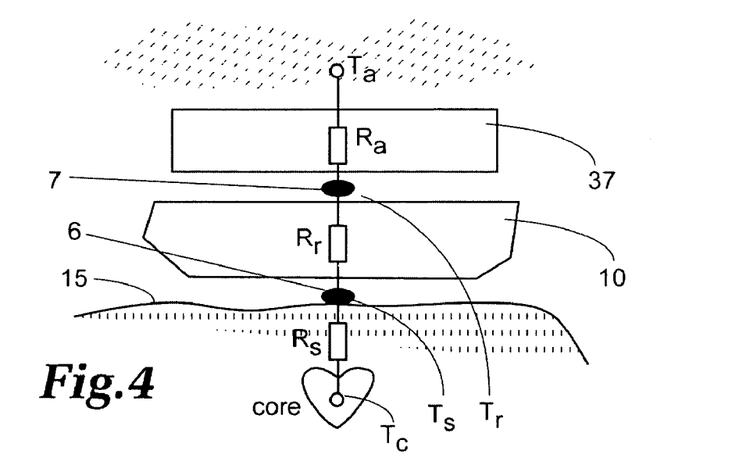
FIG. 4 is an illustration of elements of thermal conduction between a patient and the thermometer of FIG. 1 when the sensor coupled to the contact plate is in thermal contact with the skin of the patient.

FIG. 4 shows thermal coupling among selected components of the thermometer 1 and a patient's skin 15, such as would occur when the thermometer 1 is placed in contact with the forehead 23 of the patient as shown in FIG. 1. Referring to FIG. 4, when the probe 3 is pressed against the patient's skin 15, the temperature sensor 6 is thermally coupled to the patient's core through the patient's body thermal resistance $R_s$. The internal body core temperature of the patient is $T_c$. The value of $R_s$ depends on thermal properties of the patient's body, e.g., skin, fat, muscles and the like. The value of $R_s$ does not remain constant, even for the same patient, because $R_s$ is affected by factors such as, for example, the ambient, patient temperatures, patient age, clothing and the like, and is under a constant physiological control by the patient's central nervous system. Temperature distribution within the probe 3 depends on the temperature $T_a$ in the housing 2, the compressive force applied to the plate 20 by the resilient element 11 (see FIG. 2) and the thermal insulation provided by the thermal insulator 10 and any outer insulator 37 formed by the components within the housing 2.

Referring again to FIG. 4, the second sensor 7 measures a reference temperature $T_r$, which is the temperature within the interior of the housing 2. When the plate 20 of the probe 3 comes into contact with the skin 15, heat flows from the patient's core to the housing 2 of the thermometer 1 via the thermal resistances $R_s$, $R_r$ and $R_a$. As the resistance $R_s$ is not fixed, a true body core temperature computation is impossible. The true body core temperature, however, is approximated in accordance with the present invention with an acceptable degree of clinical accuracy as described below.

In one embodiment, the thermometer 1 computes a relatively accurate approximation of body core temperature from skin temperature $T_s$ and reference temperature $T_r$ using the following 2nd order equation:

$$T_c = AT_s^2 + (B+CT_r)T_s + DT_r + E \quad (1)$$

where A, B, C, D and E are experimentally determined constants. The constants A-E are determined by taking temperature measurements of a relatively large number of patients, such as 30 or more, with the thermometer of the present invention (hereinafter "device under test" or "DUT") and a reference thermometer of a conventional design. The reference thermometer must have an acceptable degree of accuracy of measuring body core temperature and, for example, can constitute an infrared ear (tympanic) thermometer. As it is well known fact that skin temperature is affected by ambient temperatures, see, for example Y. Houdas and E. F. J. Ring, *Human Body Temperature*, Plenum Press, New York and London (1982), the measurements are made while the patients and the thermometers are subjected to cold, warm and normal room temperatures. The constants A, B and C are inversely related to a patient's physiological temperature limit, $T_L$. Thus, the value of $T_L$ corresponds to the highest controllable temperature that a human body can tolerate without irreversible damage to internal organs, and is, for all practical purposes, equal to about 42° C. A well known curve fitting technique is applied to the collected temperature data to minimize differences between the DUT and the reference thermometer readings by adjusting the values of the constants. The curve fitting is performed separately for different patient age groups. In the experimentation, other anatomical factors may also be taken into account. The constants will be different for different body sites, e.g., forehead, tragus area, etc. In one embodiment, the temperature measurement site is on a neck over a carotid artery of an adult, and values of the constants in DUT are initially set as: $A=1/T_L$; $B=1+15/T_L$; $C=-0.2/T_L$; $D=-0.25$; and $E=-22$. After the constants are adjusted following curve fitting, the constants can be used in Equation (1) for determining body core temperature in accordance with the present invention.

Referring to Equation (1), although $T_s$ represents a true skin temperature, the sensor 6 of the thermometer 1 may not be able to quickly measure the true skin temperature while touching the skin 15. As well known, skin is a poor heat conductor and has a rather low specific heat. Therefore, when the plate 20 touches the skin 15 for a short time, the temperature of the skin 15 changes from a true value of $T_s$ to some measured value $T_p$. In one embodiment of the invention, a sufficiently accurate approximation of true skin temperature $T_s$ is computed for use in Equation (1) according to the following equation:

$$T_s = (T_p - T_0)\mu + T_p \quad (2)$$

where $\mu$ is an experimentally determined constant, $T_0$ is the temperature of the sensor 6 before it touches the skin 15 or baseline temperature and $T_p$ is a steady state temperature of the sensor 6 when it is in contact with the skin 15.

$T_0$ depends on many factors, including the materials used in the probe 3, ambient temperature and the history of use of the probe 3, in other words, how recently did the probe 3 (plate 20 and probe edge 3A) touch the skin of a patient. The value of $\mu$ is determined, for example, by making multiple skin temperature measurements with varying $T_0$ and then selecting a value of $\mu$ that minimizes the effects of $T_0$ on $T_s$. In one embodiment, $\mu=0.5$.

In an exemplary operation of the thermometer 1 where the shaft 8 has a very low thermal conductivity and the plate 20 has a very low thermal capacity, the time needed for taking the necessary temperature measurements for computing $T_p$ is less than about three seconds. Alternatively, if the probe 3 tip is cold, such that the baseline temperature $T_0$ is low, the temperature of the plate 20 may alter the skin 15 temperature so much that skin temperature measurements for computing $T_p$ may need to be performed for more than about three seconds.

In one embodiment, the probe 3 of the thermometer 1 includes an embedded heater 21, as illustrated in FIG. 5, for pre-warming the end 3A portion of the probe 3 including the sensor 6 and, thus, reducing the response time of the sensor 6. Referring to FIG. 5, the heater 21, the sensor 6 and the plate 20 are in intimate thermal contact with one another. The heater 21 is connected to the microcontroller 34 in the housing 2 by conductors 14 and 13, respectively. In an exemplary operation of the thermometer 1, before the plate 20 is placed in contact with the skin 15, the microcontroller 34 operates the heater 21 and monitors the temperature measurements at the sensor 6 so as to elevate the temperature of the plate 20 to a level that is warmer than ambient and slightly below an anticipated skin temperature. In one embodiment, the plate 20 is pre-warmed to about 28° C. (82° F.) and not higher than about 32° C. (90° F.). For purposes of illustration, the pre-warmed temperature is used in Equation (2) as $T_0$. The heater 21 is automatically turned off by the microcontroller 34 before or at the instant when the plate 20 touches the skin 15.

Figure 6:
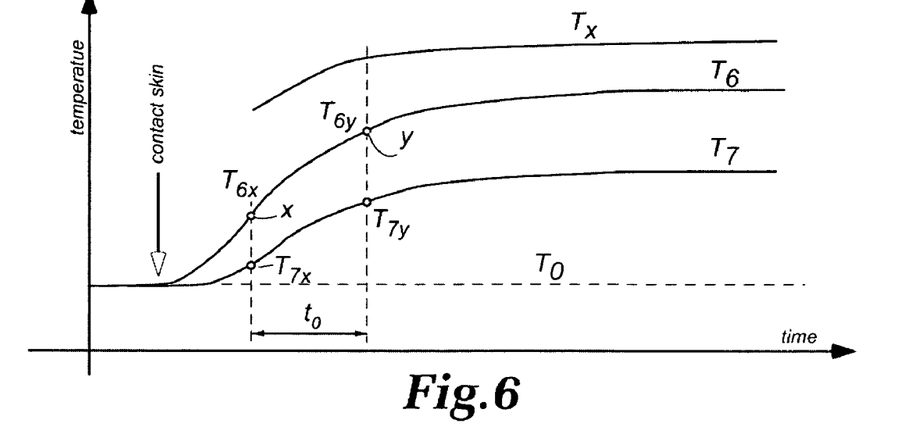
FIG. 6 is a timing diagram of an exemplary response of the sensors of the thermometer of FIG. 1 when the sensor coupled to the contact plate is in thermal contact with the skin of a patient.

The temperature $T_p$ of the sensor 6, thus, cannot be accurately determined simply based on a temperature measurement made at the sensor 6 when the sensor 6 initially contacts the skin 15. Immediately after the sensor 6 comes into contact with the skin 15, the temperature of the sensor 6 changes rather quickly and its output signal continues to change for an extended period of time. While the sensor 6 (via the plate 20) continues to be in thermal contact with the skin 15, the flow of heat from the subcutaneous tissues (e.g., carotid artery) of the patient, through the skin 15 and to the plate 20, and then further through the shaft 8, which serves as the thermal insulator 10, changes at a variable rate. FIG. 6 illustrates exemplary changes in the temperatures of the sensors 6 and 7 over time following initial contact between the plate 20 and the skin 15. As seen in FIG. 6, the temperature of the sensor 6 varies much more than that of the sensor 7. The change in heat flow continuously modifies the temperature of the skin 15 at the contact point, and thus the temperature at the sensor 6, until a steady-state level $T_p$ is reached. It is expected that settling to a steady-state level $T_p$ at the sensor 6 may take as long as a minute, which is a very long time for purposes of obtaining temperature measurements using an intermittent thermometer for determining body core temperature.

In accordance with one aspect of the present invention, the thermometer 1 determines $T_p$ by performing a two part process that dramatically reduces the computation time for $T_p$ to, in one embodiment, about one second. In the first part of the process, the thermometer 1 determines a rate of heat flow through the shaft 8 by making a series of temperature measurements at the sensor 6 separated by about ten milliseconds and over a known time interval $t_0$, such as 500 msec. The multiple measurements correspond to temperature measurement data at data points between data points x and y, as shown in FIG. 6. Pairs of temperature measurements are selected from the series of the measurements, where the data points correspond to temperatures measured by the sensor 6 that exceed a base level temperature $T_0$, or in other words, after the sensor 6 touches the skin 15. The rate of heat flow at the sensor 6 is determined from the following equation:

$$T_{pj} = \frac{T_{6y} - kT_{6x}}{1-k} \quad (3)$$

where k is a constant and typically equal to 0.5 for $t_0$=500 ms, and where $T_{6x}$ and $T_{6y}$ are the instantaneous temperature measurements made at the sensor 6 corresponding to data points between data points x and y. In the second part of the process, multiple values of $T_{pj}$ are computed from a series of data point pairs between data points x and y and then compared with one another. When the difference between two adjacent $T_{pj}$ becomes small, these two values of $T_{pj}$ are averaged to obtain a resultant temperature $T_p$ which is used in Equation (2). $T_r$ for the second sensor 7 is similarly computed as described above for the computation of $T_p$ for the sensor 6.

Referring to FIGS. 2 and 7, the thermometer 1 may include a handling detector switch 40 coupled to the microcontroller 34 via the multiplexer 32. The switch 40 is mechanically coupled to the shaft 8, or alternatively to the guard 17, via a conventional coupling element 41, which causes the switch 40 to close when the plate 20 or the shaft 8, or alternatively the guard 17, moves. The switch 40 is normally in the open condition. When the switch is in the open condition, an activation circuit in the microcontroller 34, which controls whether electrical power from the power supply 35 is supplied to electrical components in the thermometer 1, is in a non-activated state. In the non-activated state, the activation circuit provides that the supply 35 does not supply electrical power to other components within the thermometer 1. When the thermometer 1 is handled, for example, the end 3A of the probe 3 is tapped on a surface, such as a table surface, the shaft 8 moves, thereby momentarily closing the switch 40. When the switch 40 closes, the switch 40 transmits a signal to the microcontroller 34 which indicates movement, for example, the plate 20 being moved to touch the skin 15. When the microcontroller 34 receives a signal from the switch 40, the activation circuit enters an activated state and causes electrical components within the thermometer 1 to be energized from electrical power supplied by the power supply 35. The thermometer 1 then performs a measurement cycle, which includes taking temperature measurements at the sensors 6, 7 and performing data processing operations at the microcontroller 34, for determining body core temperature in accordance with the present invention. Once the measurement cycle is completed, which includes displaying the body core temperature for a predetermined time on the display 4, the activation circuit returns to the non-activated state such that electrical power is no longer supplied to the other electrical components in the thermometer 1.

Figure 8:
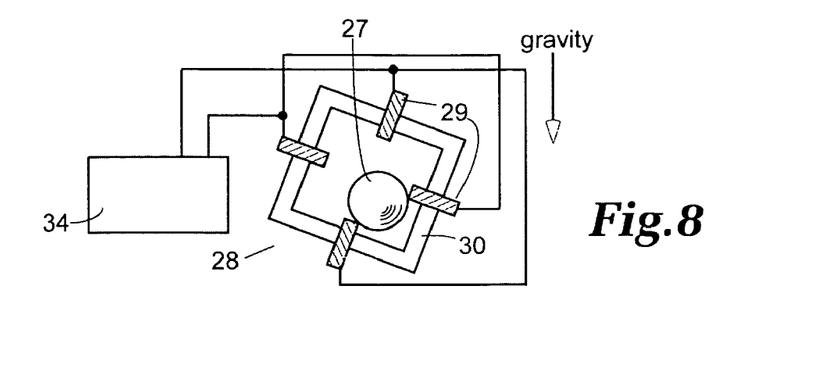
FIG. 8 is a cross-sectional view of a handling detector and connections of the handling detector to selected components within the thermometer of FIG. 1 in accordance with one embodiment of the present invention.

In an exemplary method of operation of the thermometer 1, referring to FIGS. 7 and 8, the thermometer 1 typically is in storage, such as in a medicine cabinet, and is in the non-activated state where electrical power is not supplied to the electrical components therein. When a user handles the thermometer 1, such as by picking up the thermometer, the handling detector 40 generates and transmits to the microcontroller 34 a signal that causes the activation circuit of the microcontroller 34 to operate in the activated state, such that electrical power is supplied to the electrical components of the thermometer 1. For an example of operation in an activated state, referring to FIG. 2, the probe 3 is pushed against the skin 15 of a patient and the switch 40 closes, which indicates to the microcontroller 34 the moment of contact between the skin 15 and the plate 20. The sensors 6, 7 generate and transmit to the multiplexer 32 temperature measurement data signals representative of continuous temperature measurements respectively made at the sensors 6, 7. Once the plate 20 is in contact with the skin 15, the temperature of the sensor 6, and also of the optional sensor 7, rises, although at significantly different rates. The temperatures measured at the sensor 6 are a function of the patient's temperature, which alters the thermistor resistance of the sensor 6. The multiplexer 32 routes the temperature measurement data signals to the microcontroller 34 via the A/D converter 33. The A/D converter 33 provides to the microcontroller 34 digital data representative of the temperature measurements made at the sensor 6, and optionally the sensor 7. The microcontroller 34 controls the multiplexer 32 to obtain temperature measurement data signals generated at the sensors 6 and 7 continuously at a predetermined rate. The microcontroller 34 (i) processes the digitized temperature measurement data signals supplied by the converter 33 to compute the temperature of the sensor 6, $T_0$, before the sensor 6 touched the skin 15, and (ii) stores the result in its memory (not shown) for subsequently computing the skin temperature $T_s$ in accordance with Equation (2). In addition, the microcontroller 34 stores the temperatures measured at the sensor 7 in its memory as "$T_r$". The microcontroller 34 also computes a heat flow rate of change in accordance with Equation (3) using pairs of temperature measurements taken at the sensor 6 within an interval $t_o$. When the microcontroller 34 determines that the rate of change has reached a sufficiently steady value, the microcontroller 34 computes $T_p$ as described above and then computes the skin temperature $T_s$ using Equation (2). Then, the microcontroller 34 computes the patient's core temperature $T_c$ using Equation (1), where the constants are obtained as described above, stores $T_c$ in its memory and then displays $T_c$ on the display 4. Advantageously, the time interval between the moment the thermometer 1 is placed into contact with the skin of the patient and the display of $T_c$ may only be a few seconds.

Figure 9:
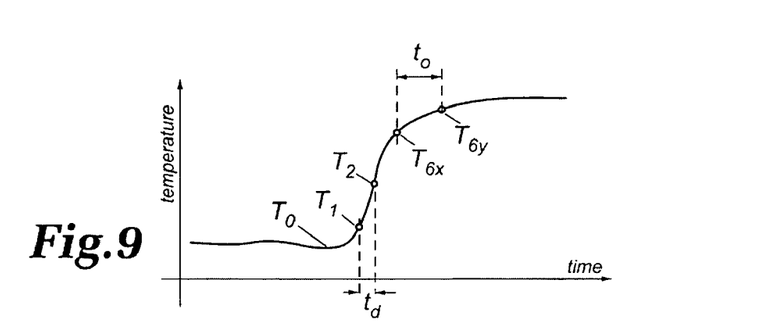
FIG. 9 is a timing diagram of an exemplary response of a temperature sensor of a thermometer in accordance with the present invention.

In an alternative embodiment, after the activation circuit causes the electronic components of the thermometer 1 to be supplied with electrical power, the microcontroller 34 constantly checks the temperature of the sensor 6 at predetermined time intervals, $t_d$, such as shown in FIG. 9, to detect contact between the plate 20 and the skin 15. The temperature of the sensor 6 remains at a relatively stable level until the plate 20 touches the skin 15. At the moment of contact between the plate 20 and the skin 15, however, the temperature of the sensor 6 begins to rise sharply. If the microcontroller 34 determines that a difference between measured temperatures $T_1$ and $T_2$ at the sensor 6 sufficiently exceeds a previous difference, the microcontroller 34 concludes that the skin 15 was touched and begins to perform temperature measurements and computations for determining body core temperature in accordance with the present invention.

In one embodiment, the switch 40 replaces the power switch 5 of the thermometer 1 to provide that electrical components within the thermometer 1 are automatically energized as soon as the user picks up the thermometer.

In alternative embodiments, the handling detector in the thermometer 1 may be in the form of any of the sensors and detectors that are known in the art for detecting handling, such as described in Jacob Fraden "*Handbook of Modern Sensors*", $3^{rd}$ ed., Springer Verlag, NY (2004), incorporated by reference herein. For example, the handling detector can comprise any one of various types of motion sensors, such as tilt detectors, or may be touch sensitive, such as through the use of a capacitive touch sensor. Redundant systems of this type may be used if desired to ensure that the thermometer is energized upon handling by the user.

In one embodiment, the handling detector is a simple motion detector 28 contained in the housing 1 and coupled to the microcontroller 34 of the thermometer 1, as shown in FIG. 8. Referring to FIG. 8, the motion detector 28 is gravity operated and includes four electrodes 29 embedded into a hollow capsule 30 in which an electrically conductive ball 27 resides. When the position of the thermometer 1 changes after it is picked up, the ball 30 rolls inside the capsule 30 and makes intermittent contact with the electrodes 29. The contact between the ball 30 and the electrodes 29 modulates electrical resistances between the adjacent electrodes. The microcontroller 34, which is coupled to the motion detector 30 to detect such contacts, causes power to be supplied to the electrical components of the thermometer 1 following the detection of such contacts.

In an alternative embodiment, the outer surface of the housing 2 of the thermometer 1 includes metal contacts that are part of a capacitive touch sensor. The touch sensor is coupled to the microcontroller 34 and electrical power is supplied to the other electrical components within the thermometer 1, as described above, when a user contacts the touch sensor.

In a further embodiment, the microcontroller 34 includes a control pad or button on the exterior of the housing 2 that can be manipulated to provide that the display scale can be changed between Celsius and Fahrenheit.

In one embodiment, the microcontroller 34 includes functionalities for automated testing of thermometer 1 components, such as, for example, testing the temperature limits of the sensors, checking the power supply, etc. In a further embodiment, the microcontroller 34 automatically turns off power to the electrical components of the thermometer 1 after a preset time interval, for example, 60 seconds, following a measurement cycle, where the measurement cycle is initiated upon contact with the skin of the patient and concludes following display of the computed body core temperature at the display 4.

Figure 10:
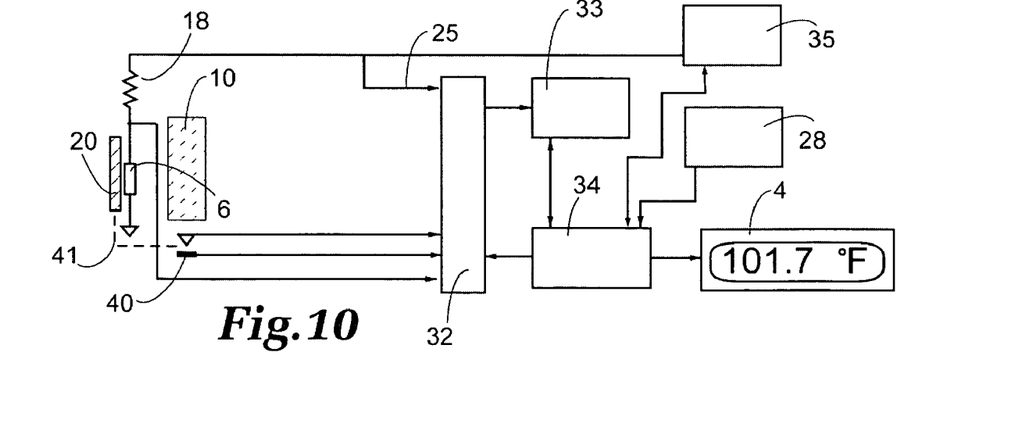
FIG. 10 is a block diagram of another embodiment of a thermometer, in accordance with the present invention, having a single temperature sensor.

In a further embodiment, the thermometer 1 includes only the sensor 6, as shown in FIG. 10. Referring to FIGS. 7 and 10, operation of the thermometer 1 without the sensor 7 is substantially identical to operation with both of the sensors 6 and 7, except that the sensor 6 performs the function of the absent sensor 7 and measures the reference temperature $T_r$ as soon as the thermometer 1 is activated (powered up). The microcontroller 34 stores the value of $T_r$ in its memory for use in performing the computation in accordance with Equation (1).

Thus, a thermometer in accordance with the present invention advantageously determines a patient's body core temperature quickly; non-invasively, in that the thermometer only needs to touch a selected location on the skin of a patient's body to make temperature measurements only for a short interval; and with a relatively high degree of accuracy.

Although several embodiments of the present invention have been described and illustrated, it will be apparent to those skilled in the art that various modifications may be made without departing from the principles of the invention.

What is claimed is:

1. A temperature sensing device for determining body core temperature by contacting skin of a patient comprising:
    a housing;
    an extension of said housing having a longitudinal axis;
    a shaft having an outer end and being mechanically non-rotatably coupled to said housing and adapted for moving within said extension along said longitudinal axis;
    a first contact type temperature sensing element supported by the outer end of the shaft and including a first contact type temperature sensor, wherein the first contact type temperature sensor generates at least a first temperature data signal representative of a temperature measurement made at the first contact type temperature sensor when the first contact type temperature sensing element is placed in contact with skin of a patient;

an electronic circuit electrically coupled with the first contact type temperature sensing element, wherein the electronic circuit uses the first temperature data signal generated at the first contact type temperature sensor to estimate a skin temperature and determines a body core temperature for the patient using the estimated skin temperature; and an indicator coupled to the electronic circuit and operable to indicate the body core temperature.

2. The device of claim 1 wherein said shaft is a thermal insulator.

3. The device of claim 1, wherein the first contact type temperature sensor generates a plurality of temperature data signals representative of temperature measurements made at the first contact type sensor when the first contact type temperature sensing element is placed in contact with the skin of the patient, and wherein the electronic circuit uses the plurality of temperature data signals to estimate the skin temperature.

4. The device of claim 3, wherein the first contact type temperature sensor generates at least a second temperature data signal representative of a temperature measurement made at the first contact type temperature sensor before the first contact type temperature sensing element is placed in contact with the skin.

5. The device of claim 1 further comprising:

a second temperature sensor coupled to the housing, wherein the second temperature sensor is positioned to be thermally decoupled from the skin during measurement of the skin temperature by the first contact type temperature sensor, wherein the second temperature sensor is operative to detect a reference temperature and generate at least one second temperature data signal representative of the reference temperature, and wherein the electronic circuit uses the first and second temperature data signals generated by the first and second temperature sensors to determine the body core temperature.

6. The device of claim 1, further comprising a mechanism for moving said shaft in and out of said extension, wherein the shaft is configured to move into at least first and second positions, wherein the first position is a position at which the first contact type temperature sensing element is not adapted for contact with the skin and the second position is a position at which the first contact type temperature sensing element is adapted for contact with the skin.

7. The device of claim 6, wherein the shaft includes a resilient element normally biasing the first contact type temperature sensing element toward the first position.

8. The device of claim 1, wherein the housing comprises a switch mechanically coupled to the shaft for detecting movement of the shaft to the second position.

9. The device of claim 1 wherein said extension is moveable relative to the first contact type temperature sensing element to allow the first contact type temperature sensing element to contact the skin.

10. The device of claim 4 wherein said electronic circuit uses said second temperature data signal to estimate skin temperature.

11. A medical thermometer for use by an operator and intended for noninvasive determination of body core temperature by way of contacting skin of a patient, comprising:

a housing;

a shaft having a tip and being capable of moving in a direction toward the housing from a first position to a second position, wherein the tip is positioned relatively closer to the housing in the second position than in the first position;

a first temperature sensor positioned at the tip of said shaft and adapted for contacting the skin of the patient and generating signals in response to temperature of the skin;

a guard being adapted to surround said first temperature sensor when the shaft is in the first position;

a mechanism supported by said housing and capable of moving said shaft from said first position to said second position with a predetermined rate of motion; and a computational means for computing the core temperature of the patient from the signals generated by the first temperature sensor;

wherein the first position is adapted for preventing the first temperature sensor from contacting the skin of the patient.

12. A medical thermometer of claim 11 further comprising an electrical switch adapted to send a signal to the computational means in response to motion of said shaft from the first position to the second position.

13. A medical thermometer of claim 11 further comprising a resilient element being coupled to said housing and said shaft and adapted for exerting a predetermined force.

14. A medical thermometer of claim 11 further comprising a pushbutton being supported by said housing and intended for actuating said mechanism by the operator.

* * * * *